US005082569A

United States Patent [19]

Homeier et al.

[11] Patent Number: 5,082,569
[45] Date of Patent: Jan. 21, 1992

[54] REMOVAL OF METALS FROM LIQUEFIED HYDROCARBONS

[75] Inventors: Edwin H. Homeier, Elmhurst; Peter O. Hennes, Palatine; Padma V. Tota, Naperville, all of Ill.

[73] Assignee: UOP, Des Plaines, Ill.

[21] Appl. No.: 620,804

[22] Filed: Dec. 3, 1990

[51] Int. Cl.$^5$ .............................. B01D 15/04
[52] U.S. Cl. ........................... 210/679; 210/688; 208/251 R; 585/822; 585/823
[58] Field of Search ................ 210/688, 679; 208/251 R, 253; 585/820, 822, 823, 830

[56] References Cited

U.S. PATENT DOCUMENTS

| 2,341,329 | 2/1944 | Myers | 210/688 |
|---|---|---|---|
| 2,534,907 | 12/1950 | Homeier et al. | 210/688 |
| 3,194,629 | 7/1965 | Dreibelbis et al. | 23/2 |
| 3,873,581 | 3/1975 | Fitzpatrick et al. | 210/688 |
| 4,046,688 | 9/1977 | Cunningham et al. | 210/688 |
| 4,094,777 | 6/1978 | Sugier et al. | 210/688 |
| 4,136,021 | 1/1979 | Whitehurst | 210/688 |
| 4,196,173 | 4/1980 | deJong et al. | 423/210 |
| 4,239,865 | 12/1980 | Tarao et al. | 210/688 |
| 4,500,327 | 2/1985 | Nishino et al. | 55/72 |
| 4,591,490 | 5/1986 | Horton | 423/210 |
| 4,614,592 | 9/1986 | Googin et al. | 210/688 |
| 4,747,954 | 5/1988 | Vaughn et al. | 210/688 |
| 4,752,398 | 6/1988 | Holbein et al. | 210/688 |
| 4,873,065 | 10/1989 | Braun et al. | 210/688 |
| 4,874,525 | 10/1989 | Markovs | 210/673 |
| 4,892,567 | 1/1990 | Yan | 55/33 |
| 4,946,596 | 8/1990 | Furuta et al. | 210/688 |
| 4,950,408 | 8/1990 | Duisters et al. | 210/660 |

*Primary Examiner*—Stanley S. Silverman
*Assistant Examiner*—Cynthia L. Nessler
*Attorney, Agent, or Firm*—Thomas K. McBride; Eugene I. Snyder

[57] ABSTRACT

The metal concentration in a liquid hydrocarbon stream can be reduced to no more than 0.1 parts per billion by contacting the stream sequentially with a cation exchange resin and a silver-impregnated zeolitic molecular sieve, preferably in that order. The method is particularly useful for removal of mercury and antimony from liquified petroleum gas.

5 Claims, No Drawings

REMOVAL OF METALS FROM LIQUEFIED HYDROCARBONS

BACKGROUND OF THE INVENTION

This application relates to the removal of certain metals from liquid hydrocarbons. More particularly, it relates to the removal of metals from liquefied hydrocarbons, often referred to as LPG (liquefied petroleum gas), that is, a stream containing hydrocarbons normally gaseous at ambient temperature but which has been liquefied for storage and transportation convenience. The metals whose removal is specifically addressed are mercury, lead, antimony, arsenic, and copper.

LPG often is a byproduct of liquefied natural gas (LNG) production, and contains mainly $C_3$, $C_4$, and $C_5$ hydrocarbons. Several metals, principally mercury and to a lesser but nonetheless important extent antimony, lead, arsenic, and copper are natural contaminants as LPG is produced from wellhead gas. Although metal concentrations rarely attain levels even as high as 1 ppm, nonetheless their presence even at concentrations above 1 ppb can be deleterious. For example, mercury as a chief offender at levels of even several ppb causes corrosion of aluminum, which is extensively used in the heat exchangers of the separation-adsorption train. Arsenic is a poison whose removal is required for health and safety reasons. Consequently there is a need for the removal of these metals from LPG as well as from other liquid hydrocarbon feedstocks.

Present methods of removal are based on the adsorption of the subject metals by suitable materials. Among the adsorbents currently used may be mentioned charcoal, especially charcoal containing sulfur (U.S. Pat. No. 3,194,629) and other mercury-reactive materials (U.S. Pat. Nos. 4,196,173 and 4,500,327), ion-exchange adsorbents having thiol groups (U.S. Pat. No. 4,950,408) and polysulfides (U.S. Pat. No. 4,591,490), and certain silver oxide impregnated zeolites. All have limitations based on their capacity, the degree of metal removal at equilibrium, their regenerability, or some combination of the above. In this application we disclose a combination of adsorbents which, when used in series, is exceptionally effective in removing the aforementioned metals, and especially mercury, to leave levels of no more than about 1 ppb (parts per billion), and generally no more than 0.1 ppb, in the treated LPG. In another aspect our invention is a method of determining the concentration of metals of the aforementioned class in liquefied hydrocarbons at concentrations down to at least 1 ppb.

SUMMARY OF THE INVENTION

In one aspect the invention which is described within is a method of removing certain metals from liquid hydrocarbon streams. An embodiment comprises contacting the liquid hydrocarbon stream sequentially with a bed of a strong acid cation exchange resin and a bed of a zeolitic molecular sieve containing surface-impregnated silver. In a more specific embodiment the liquid hydrocarbon stream is a liquified petroleum gas. In a still more specific embodiment metal concentration is reduced to a level of not more than 0.1 parts per billion. In another aspect the invention is a method of determining the concentration of certain metals in liquid hydrocarbon feedstocks down to a level of at least 10 parts per trillion (0.01 parts per billion). Other aspects and embodiments will become clear from the following description.

DESCRIPTION OF THE INVENTION

The invention described below is for the removal of certain metals from liquid hydrocarbons, especially liquefied petroleum gas, which initially contains one or more of the metals at a concentration up to 5 ppm. As a result of our removal method the metal concentration is reduced to a concentration of no more than about 0.1 ppb. What we have found is that when the usual kinds of strong acid cation exchange resins (those not containing mercaptan or polysulfide moieties) are used to remove metals from the streams in question there is an unacceptably high equilibrium concentration of some of the metals, especially antimony, remaining in the treated stream; i.e., the equilibrium value in the treated stream of metals such as antimony (100 ppb) and mercury are unacceptably high when only the usual type of strong acid cation exchange resins are used. In contrast, when such a cation exchange resin is used in conjunction with a zeolitic molecular sieve containing surface-impregnated silver, it is found that all of the metals from the aforementioned group can be reduced in concentration to at least 0.1 ppb.

The ion exchange resins which may be used in the practice of this invention are cation exchange resins, especially strong acid cation exchange resins. Whereas the prior art required the presence of mercaptan or polysulfide groups on ion exchange resins to be effective in the removal of metals from the liquid hydrocarbon streams in question, this invention instead requires the absence of such moieties. The nature of the cation exchange resin, other than positively lacking mercaptan and polysulfide moieties, is not particularly critical and normally will consist of a long polymer chain carrying a multiplicity of sulfonic acid groups. Both macroreticular strong acid cation exchange resins, such as a highly crosslinked sulfonated polystyrene, and microreticular cation exchange resins may be used in the practice of this invention. Examples of such materials include sulfonated polystyrene, sulfonated polystyrene copolymers, such as a divinylbenzene cross-linked styrene, sulfonated divinylbenzene, styrenedivinylbenzene imidoacetate, phenolic resins, especially bearing sulfonic or carboxylic acid groups, polystyrene having nuclear phosphonic acid moieties, polyacrylic acid, and copolymers of acrylic acid and divinylbenzene. It must be emphasized that cation exchange resins are well known staple articles broadly available from many sources, so that the foregoing list is merely illustrative of but a few representative suitable materials.

Liquefied petroleum gas is the principal liquid hydrocarbon feedstock to be treated according to the practice of this invention. However, other liquid hydrocarbons can be expected to be suitable feedstocks and are of significant importance in the practice of this invention because of their elevated metal content. Examples of such feedstocks include liquified gas mixtures containing varying fractions from approximately 0.1 to approximately 80% by volume or higher of methane, ethane, propane, butane, pentane and hexane from distillations; various commercial petroleum refinery and petrochemical process streams such as streams from distillation processes, hydrocracking processes, alkylation processes, dehydrogenation processes, hydrogenation processes, sweetening processes, aromatization processes, oxidation processes, hydroformylation processes, dehydrochlorination processes, etc.; light and heavy naphthas; streams from commercial fats and oils processing, such as hydrogenation; streams from petroleum extraction processes such as liquefaction, natural gas processing, etc. A characteristic common to all the feedstocks of this invention is the presence of one or more of mercury, antimony, lead, arsenic, and copper at a concentration as high as about 5 ppm, although it is rare that levels will exceed 1 ppm, and more usually the metal content will be less than 0.1 ppm.

The other adsorbent used in series with the cation exchange resin is a zeolitic molecular sieve whose surface is impregnated with ionic or elemental silver, as is described in U.S. Pat. Nos. 4,874,525 or 4,892,567, all of which is hereby incorporated by reference. It is known that such materials are quite effective in removing mercury, but we have discovered in addition that these materials are also quite effective in reducing antimony from liquid hydrocarbon streams to levels under 0.1 ppb. Since the typical cation exchange resins used in the practice of this invention fails to reduce antimony to levels appreciably less than 100 ppb, such silver-impregnated sieves are especially valuable in combination with the aforementioned cations exchange resins.

In the usual practice of this invention, the liquid hydrocarbon stream is contacted with the aforementioned adsorbents at a temperature from about $-5°$ to about $50°$ C. and at whatever pressure is needed to maintain the stream as a liquid at the indicated temperature. In practice the pressure may vary from about 50 to about 250 psig in an LPG stream. The adsorbent will be as a packed bed through which the liquid hydrocarbon feedstock flows, with the feedstock preferably passing first through the cation exchange resin bed and thereafter through the silver-impregnated zeolitic molecular sieve. The weight ratio of the two adsorbents is susceptible to wide variation without greatly influencing the success of our method, although its cost may be significantly affected. Most usually the weight ratio of the cation exchange resin to the zeolitic molecular sieve is from about 1:1 up to at least 4:1, but it needs to be stressed that a successful practice of the invention is not particularly sensitive to this ratio.

The cation exchange resin is readily regenerable by conventional means, which is to say by washing used resin with a strong acid so as to replace the exchanged metal with hydrogen ions. The regeneration of cation exchange resins with diminished capacity is sufficiently well known as to require no further elaboration. The silver-impregnated zeolitic molecular sieve also can be regenerated, at least as to mercury, by simply heating the sieve at a temperature between about $260°$ and about $315°$ C. to volatilize the absorbed mercury. However, although both adsorbents are regenerable, it is not meant to imply that it is necessary to regenerate one or both of them for the successful practice of the invention even though economics may strongly favor such regeneration.

The method used for the removal of the designated class of metals from liquid hydrocarbon feedstocks also can be used quite effectively for the analysis of metal content in such feedstocks. Quite briefly, the feedstock in question is passed through a column containing the aforementioned adsorbents in series at a rate and for a time sufficient to cause measurable amounts of the metals present to be retained by the adsorbent train. The adsorbent is then removed, extracted, and the extract is analyzed by inductively coupled plasma mass spectrometry (ICP-MS) to determine the metals content. Alternatively, a graphite furnace atomic absorption spectrometry (GF-AAS) procedure may be used. Metals recovery from both the ion exchange resin and zeolitic molecular sieve is preferably attained by extraction with hot aqua regia. In both cases a blank of unused adsorbent is subjected to the same procedure in order to provide a reference for the ICP-MS analysis or, where used, the GF-AAS method.

The following examples are only illustrative of the invention and do not limit it in any way.

EXAMPLE 1

Guard Bed

The experiment described below was conducted to test the adsorption of metals from LPG and the distribution of metals in the adsorbents of the invention. It is generally not required that the adsorption column be divided into individual segments separated by glass wool as described below; an unsegmented column may be used with equivalent adsorption results, although it will not be as easy to determine the distribution of metal species as was possible using the segmented column.

Preparation of Segmented Adsorption Column

A schedule-80, 316 Stainless Steel pipe 749 mm long and 17.1 mm inside diameter was threaded on both ends so that the threads fit into fittings attached to the lines of an adsorption train. The threaded pipe was degreased by thoroughly brushing and rinsing the interior surfaces with isooctane and rinsing with acetone and allowed to dry. A 20 gram portion of granular Amberlyst-15 (Rohm and Haas cation exchange resin) was dried for 72 hours at $50°$ C. in a vacuum oven; a portion of the dried resin, hereinafter referred to as Adsorbent A, was packed into the pipe as described below. A sample of the zeolitic molecular sieve whose surface is impregnated with silver, hereinafter referred to as Adsorbent B, was also obtained (HGSIV, from UOP, Des Plaines, IL) and packed into the pipe as described below.

The dry pipe was first packed with a sufficient quantity of glass wool to form a 50 mm packed bed at the column outlet. Five $2\pm0.1$ gram portions of Adsorbent B were then packed into the pipe at the outlet end, as follows. A portion of adsorbent was added and the column was tapped to form uniform, packed beds approximately 3.5 cm long. Then sufficient glass wool was added to form a packed bed approximately 2 cm long. After the fifth portion of Adsorbent B had been packed into the column, another 2 cm packed bed of glass wool was added. Finally, eight $2\pm0.1$ gram portions of Adsorbent A were added to the pipe to form uniform packed beds approximately 3.5 cm long at the inlet end of the column. Each packed bed was prepared in the same way as described above for Adsorbent B and each bed of Adsorbent A was separated by a packed bed of glass wool approximately 2 cm long. The masses of the packed beds were recorded to the nearest mg and a final portion of glass wool was added at the column inlet to form a packed bed 50 mm long.

Preparation of LPG Sample with Known Metal Concentrations

A) Preparation of Propane and Hexane

A pure propane sample was prepared by first passing $99+\%$ liquid propane over a supported nickel catalyst (2 inch diameter by 10 inch long bed) at $120°$ C. and 6894 kPa gauge (1000 psig) of hydrogen pressure at a rate of 200 g per hour. The product was dried by passing it through 3A molecular sieves (2 inch diameter by 24 inch long bed) and the pure propane was collected in a nine gallon pressure vessel at approximately 180 psig and room temperature. Pure hexane was dried over 3A molecular sieves and deoxygenated by freeze thaw cycles and stored under pure nitrogen in a 5 L glass reservoir.

B) Preparation of Metal Stock Solutions

The purified hexane was used to prepare a stock solution containing trimethylarsine, trimethylstibine and dimethylmercury at concentrations of approximately 500 parts per million (mass/volume ppm) of each metal, as follows. A portion of the purified hexane was transferred into a one gallon stainless steel pressure vessel which was fitted with a septum and valve system. Portions of 99.99% pure alkylmetal compounds were injected into the hexane in the 1 gallon pressure vessel through the septum attached to the pressure vessel to produce the desired concentrations of As, Sb and Hg in the stock solutions. The exact concentration of the metals in this first hexane stock solution was determined from the mass of the hexane added to the pressure vessel and the volume and densities of the alkylmetal compounds added.

Similarly, stock solutions containing bis(2,2,6,6-tetramethyl-3,5-heptanedionato) copper(II) and lead(II) cyclohexanebutyrate in pure hexane were prepared under nitrogen in volumetric glassware. Weighed quantities of the organometal compounds were added to a volumetric flask. Then sufficient dry, deoxygenated hexane was added from the hexane reservoir to bring the volumetric flasks to the mark. This second hexane stock solution contained approximately 100 ppm of Cu and Pb.

C) Preparation of Propane Solution.

A 2 mL aliquot of the As, Sb, Hg stock solution was withdrawn from the stock solution with a syringe and injected into an evacuated septum attached to the filled LPG pressure vessel. The aliquot was rinsed into the LPG vessel with 100 mL of hexane. A similar procedure was used to add an aliquot of the lead and copper stock solution to produce a pure propane solution containing approximately 35 ppb and 10 ppb of copper and lead respectively and 100 ppb of the other metals in propane that was slightly diluted with hexane. The LPG solution containing known amounts of Hg, Cu, As, Pb and Sb was throughly mixed by repeatedly inverting and shaking the LPG charger to make a homogeneous solution. The exact concentration of the metals was determined from the concentrations in the stock solutions and the weight of the LPG pressure vessel before and after the addition of propane and the hexane to the vessel.

Adsorption of Metals from LPG

The LPG pressure vessel and the packed adsorption column were attached to an adsorption train. The propane solution containing the metals was passed over the adsorbents at an average rate of 224 g/hr for 46 hours. Once the adsorption was completed the propane flow was terminated and the residual LPG in the column was blown out of the column with a nitrogen stream at a rate of approximately 2 L/min for 10 minutes. The nitrogen was displaced with air that was blown through the column for 10 min. at approximately 2 L/min.

Retrieval of Adsorbent Segments

The column was disconnected from the apparatus and each of the adsorbent beds was quantitatively removed from the column and collected in separate tared bottles. The recovery of the adsorbent bed segments was slightly larger than 100% (101.4%) due to residual adsorbed hydrocarbon.

Determination of Metal Distribution

The metals in each adsorption segment was determined by dissolution of the metals according to the procedure described in Example 2. The arsenic, antimony and mercury were distributed as shown in Table 1 below; all the copper and lead were found in the first bed segment at the inlet of the resin bed. The results of Table 1 clearly show the inadequacy of the resin bed alone in removing at least mercury and antimony. For example, although the last 4 segments of the resin bed were free of mercury, not all of the mercury in the LPG stream had been removed with additional amounts appearing in the subsequent HGSIV segments.

TABLE 1.1

| Determination of Metal Distribution in a Segmented Column | | | | | | |
|---|---|---|---|---|---|---|
| Element | Limit of Detection/ Quantitation, μg | | Metals Found & Methods, μg | | Bed No. | Segment I.D. |
| | ICP-MS[a] | AAS | ICP-MS | AAS | | |
| MERCURY | 0.6/1.9 | 0.4/1.5 | 800 | 846 | 1 | RESIN |
| | | | 160 | 143 | 2 | " |
| | | | 17 | 14 | 3 | " |
| | | | 1 | 2 | 4 | " |
| | | | | <LOD[b] | 5-8 | " |
| | 6.4/22 | 1.4/4.7 | 60 | 83 | 9 | HGSIV |
| | | | 25 | 30 | 10 | " |
| | | | <LOD | 8 | 11 | " |
| | | | Lost | 6 | 12 | " |
| | | | <LOD | 3 | 13 | " |
| Totals: Expected, 1091 μg | | | Found, 1063 μg | 1135 μg | | |
| ANTIMONY | 1.6/5.2 | 0.7/2.3 | 380 | 346 | 1 | RESIN |
| | | | 120 | 110 | 2 | " |
| | | | 48 | 32 | 3 | " |
| | | | 32 | 20 | 4 | " |
| | | | 26 | 14 | 5 | " |
| | | | 22 | 14 | 6 | " |
| | | | 16 | 8 | 7 | " |
| | 2.4/7/8 | 0.5/1.6 | 364 | 234 | 9 | HGSIV |
| | | | 96 | 52 | 10 | " |

TABLE 1.1-continued

Determination of Metal Distribution in a Segmented Column

| Element | Limit of Detection/Quantitation, μg | | Metals Found & Methods, μg | | Bed No. | Segment I.D. |
|---|---|---|---|---|---|---|
| | ICP-MS[a] | AAS | ICP-MS | AAS | | |
| | | | 4 | 2 | 11 | " |
| | | | <LOD | — | 12-13 | " |
| Totals: Expected, 1091 μg | | | Found, 1108 μg | 832 μg | | |
| ARSENIC | 0.2/0.5 | 0.3/1.1 | 1030 | 970 | 1 | RESIN |
| | | | 14 | 14 | 2 | " |
| | | | | <LOD | 3-8 | " |
| | 6.9/23 | UNKN | | <LOD | 9-13 | HGSIV |
| Totals: Expected, 1043 μg | | | Found, 1044 μg | 984 μg | | |

[a]Limits for the ICP-MS parameter settings for this test only; it is estimated that up to about 1/100 of the limits quoted are accessible if more sensitive ICP-MS settings are used.
[b]Level of detection.

Example 2

Analytical Method

Introduction

This method is for determining 1 to 100 mass parts per billion (1 g in $10^9$ g = 1 ppb) of mercury, antimony, arsenic, lead and copper in liquid hydrocarbon streams, and especially liquified petroleum gas (LPG). The method is limited to liquid fractions and may not be valid for the determination of metals in gas fractions obtained from the LPG.

Outline of the Method

Two pre-packed adsorbent columns are required for the analysis, one for the determination of mercury and the other for the determination of arsenic, antimony, copper and lead. Each is installed in the LPG line at the operating unit. A known volume of the LPG is passed through the column at a specified rate for a specified period of time and the metals contained in the LPG are quantitatively adsorbed. The columns are removed from the LPG line, purged with nitrogen, and then air. Adsorbent is then extracted and analyzed by Inductively Coupled Plasma-Mass Spectrometry (ICP-MS) to determine the metals content. Alternatively, a Graphite Furnace-Atomic Absorption Spectrometry (GF-AAS) procedure, as described below, can be used. The metal concentration of the LPG is calculated from the mass of metal determined on the adsorbent and the mass of the LPG passed through the column.

Reagents and Materials

All reagents conformed to the specifications established by the Committee on Analytical Reagents of the American Chemical Society, when such specifications were available, unless otherwise specified. References to water mean deionized or distilled. Acetone was 99.5% minimum purity. Adsorbent A (resin) was a granular cation-exchange resin, such as Amberlyst-15 from Rohm and Haas. The resin was dried before use by heating 50-g portions in an evaporating dish at approximately 50° C. for 72 hours in a vacuum oven at 29 inches vacuum. Adsorbent B was a product obtained from UOP as HGSIV.

Aqua regia, 20%: Using graduated cylinders, 15 mL of concentrated hydrochloric acid and 5 mL of concentrated nitric acid were added to a 100-mL volumetric flask contained in a fume hood. The solution was brought to volume with water and mixed thoroughly by pouring the contents alternatively into a 250-mL beaker and the volumetric flask and stored loosely capped in the volumetric flask to avoid pressure build up.

Aqua regia, 80%: Using graduated cylinders, 60 mL of concentrated hydrochloric acid and 20 mL of concentrated nitric acid were added to a 100-mL volumetric flask contained in a fume hood. The solution was brought to volume with water and mixed thoroughly by pouring the contents alternatively into a 250-mL beaker and the volumetric flask.

Argon, used as purge gas, had a minimum purity 99.996%. Hydrochloric acid had heavy metals, as Pb, at less than 10 ppb, and nitric acid had heavy metals, as Pb, at less than 10 picogram. Sulfuric acid and 30% hydrogen peroxide each had heavy metals, as lead, at less than 1 ppb. Isooctane was 99% minimum purity. Rhodium and thallium were used as 100-ppm solutions obtained from Inorganic Ventures (not required if AAS is used for analysis). Standard solutions containing 1000-ppm concentration each of Hg, As, Pb, and Cu each in nitric acid and Sb in hydrochloric acid also were obtained from Inorganic Ventures.

The columns were packed at the outlet end by inserting a sufficient quantity of glass wool to form a 60-mm packed bed. Adsorbent B (HGSIV), 2±0.1 g, was added to the column which was vibrated to produce a uniform packed bed. Additional glass wool was inserted into the column to produce a 20-mm packed bed, and the addition of adsorbent B and glass wool was repeated two more times to make a total of three 2-g portions of the adsorbent B and ending with a 20-mm glass wool bed. Adsorbent A (cation exchange resin), 12±0.1 g, was thereafter added and the column was vibrated to produce a bed that was approximately 210-mm long. Sufficient glass wool packing was inserted to fill the column to the inlet end.

Procedure

Metals Adsorption

Metals were collected on the column by passing the LPG through the column at a rate of 224 g/hr and for a time sufficient to deposit up to about 1 mg of the metals of interest on the column. Table 1 served as a guide for flow rate and time depending upon the estimated metal content in the LPG. A pressure in the column of 1069 kPa gauge (155 psig) or higher must be maintained throughout the collection time to maintain the LPG in the liquid state.

TABLE 1

| Estimated Metal in LPG, ppb | Collection Time, hrs |
|---|---|
| 100 | 24 |

TABLE 1-continued

| Estimated Metal in LPG, ppb | Collection Time, hrs |
|---|---|
| 10 | 48 |
| 1 | 96 |

The total mass of the LPG that contacted the adsorbent was determined from the time, temperature, and flow rates of the LPG stream from the following equation:

$$G = FDT$$

where:
D = density of LPG, g/cc
F = flow rate of LPG, cc/hr
G = mass of LPG, g
T = time LPG passed through column, hr Preparation of Sample Solutions Adsorbent was retrieved from each bed by quantitatively collecting the adsorbent in separate sample bottles and sequentially removing and discarding each 2-cm long, glass wool plug separating the adsorbent bed portions.

The chart below outlines the four digestion methods that were used for: Hg in Adsorbent A; or Hg in Adsorbent B; or As, Sb, Cu and Pb in Adsorbent A; or As, Sb, Cu and Pb in Adsorbent B. The detailed procedure for each digestion follows.

| Digestion Method | Digestion Method Outline | Adsorbent | Metals Determined |
|---|---|---|---|
| I | Extraction with 20% aqua regia without added Pd | A | Hg |
| II | Total dissolution in pure $H_2SO_4$—$HNO_3$ with added Pd | A | As, Sb, Cu, Pb |
| III | Extraction with 80% aqua regia without added Pd | B | Hg |
| IV | Extraction with 80% aqua regia with added Pd | B | As, Sb, Cu, Pb |

DIGESTION METHOD I (Hg in Adsorbent A)

Adsorbent A was transferred to a 400-mL beaker. 12±0.01 g of unused adsorbent A was placed in a 250-mL beaker for use as a blank. There was added 240 mL of 20% aqua regia to the sample and 120 mL to the blank and a stirring bar to each beaker. The beakers were stirred for one hour at a temperature of 60°±5° C. The supernatant liquid from each beaker was decanted into separate syringes to which 5-µm disposable filter units were attached. The decanted solutions were pressure filtered and the filtrates placed into a 250-mL flask for the blank and a 500-mL flask for the sample. Each of the beakers containing the column packings were washed with several milliliters of water and the water wash was filtered as described into the proper volumetric flask. To the blank flask was added 25 mL of concentrated hydrochloric acid and to the sample solution was added 50 mL of concentrated hydrochloric acid. The cooled solutions were brought to volume with water and thoroughly mixed.

DIGESTION METHOD II

Adsorbent A was transferred from bed No. 1 to a beaker containing a stirring bar. A 24±0.01 g sample of moist, unused adsorbent A was transferred into another beaker for use as a blank. To each of the above was added a 5 mL portion of the 10,000 ppm palladium solution followed by 50 mL of concentrated sulfuric acid. Each was heated to approximately 220°±20° C. while being stirred until the adsorbent was totally dissolved. Approximately 100 mL of nitric acid was added slowly, in 1 mL aliquots, to each of the beakers and the temperature was gradually raised to 350°±20° C. with stirring, at which temperature the mixtures were maintained until oxidation was complete as indicated by a clear red-brown palladium solution. To the cooled (room temperature) solutions were added approximately 100 mL of water and the mixture was gently boiled for 30 minutes to redissolve traces of salts. The cooled solutions were quantitatively transferred to a 500 mL volumetric flask, filled to the indicated volume, stoppered, and mixed thoroughly.

DIGESTION METHOD III (Hg in Adsorbent B)

Each portion of adsorbent B from beds 2, 3 and 4 was ground to a fine powder in a ball mill grinder for 15 minutes, and a 2±0.01 g portion of the unused adsorbent B was similarly ground for use as a blank. The powder obtained from each portion was quantitatively transferred from the grinder to a separate 100mL beaker. To each of the beakers was added 40 mL of 80% aqua regia and a stirring bar and the beakers were heated with stirring for one hour at a temperature of 90°±5° C.

Each slurry was quantitatively transferred into tared centrifuge tubes, the tubes were balanced, weighed to obtain the total slurry weight, then centrifuged at 17,000 rpm for 30 minutes. The supernatant solution was transferred to a tared 100-ml volumetric flask and weighed, after which 20 ml of concentrated hydrochloric acid was added and the solution allowed to degas for five minutes, then filled to volume and mixed.

DIGESTION METHOD IV

Each portion of adsorbent B from beds 2–4 was ground to a fine powder in a stainless steel ball mill grinder for 15 minutes. A 2±0.01 g portion of unused adsorbent was similarly ground for use as a blank. Each of the foregoing portions of adsorbent B, including the unused one, was transferred to separate 100 mL beakers containing a stirring bar. 1 mL of the 10,000 ppm palladium solution and 2±1 mL of water were added to each of the samples as above followed by addition of 40 mL of 80% aqua regia. Each mixture was warmed to 100°±10° C. and stirred for 1 hour. Liquid was removed by decantation and the slurry from each beaker was poured into separate 50 mL tared Teflon centrifuge tubes. The residual solid in each beaker was rinsed into the corresponding centrifuge tube with a minimum volume of water. The tubes were balanced by addition of the minimum amount of water necessary and reweighed to obtain the total weight of the slurries. After being vigorously shaken, the slurries were centrifuged at 17,000 rpm for 30 minutes. The supernatant solution was decanted from each of the tubes into separate tared 100 mL volumetric flasks which then were reweighed to obtain the mass of the decanted supernatant. To each of the flasks was added 20 mL concentrated hydrochloric acid, and the solutions then were brought to 100 mL with water.

ICP-MS Analysis

Standards were prepared by addition of aliquots of the stock metal standards to portions of the appropriate matrix for the element to be determined at metal concentrations of 50-, 100-, and 500- ng/mL.

One set of standards was to be used for the determination of mercury in Adsorbent A, a second set for mercury in Adsorbent B. Similarly, a third set of standards was required for determination of antimony, arsenic, copper and lead in Adsorbent A and a fourth set for these elements in Adsorbent B.

The matrix for each standard was the same as those described under *Preparation of Sample Solutions*.

After following the manufacturer's recommendations for adjusting the argon flow and ignition of the argon plasma of the ICP-MS, the system was allowed to stabilize for a minimum of 30 minutes. The plasma and mass spectrometer parameters then were adjusted for optimum response. An appropriate amount of rhodium or thallium internal standard was added to the samples, standards and blank from adsorbent A to produce a concentration of 100 ng/mL. Rhodium is used for copper, antimony and arsenic while thallium is used for Hg and Pb. The standards and blank for the adsorbent A were aspirated, allowing sufficient time for washout between samples. The 100-ng/mL standard was repeated, and if the measured value obtained was not within ±5% relative, of the known value, the entire series of standards and samples was reread. One volume of the adsorbent B sample and blank solutions was diluted with 9 volumes of water, adding the appropriate internal standards at 100 ng/mL. The procedure above for the adsorbent B, standards, blank and samples was then repeated.

Calculations

The equipment manufacturer's algorithm was used to determine the concentration of each metal in $\mu$g/mL in the ICP-MS sample solutions. The concentration of each element in adsorbent A was calculated using the following equation:

$$S_j = E_j V$$

where:
- $E_j$ = concentration of the jth element in the solution from adsorbent A, $\mu$g/mL
- $S_j$ = mass of the jth element in adsorbent Ag ($\mu$g)
- $V$ = volume of the solution from adsorbent A, mL The amount of each element, in $\mu$g, in the individual beds 1, 2 and 3 of adsorbent B, were calculated using the equation, $$M_i = E_i V_i [T_i - (0.7\ W_i)/A_i]$$

where:
- $A_i$ = supernatant liquid decanted from the centrifuge tubes for the ith portion, g;
- $E_i$ = concentration of each element in the solutions from the ith adsorbent B bed, $\mu$g/mL;
- $M_i$ = mass of each element in the ith adsorbent B bed, $\mu$g;
- $T_i$ = total ith sample slurry centrifuged, g;
- $V_i$ = volume of the ith solution, mL;
- $W_i$ = mass of the ith adsorbent B bed, extracted, g;
- 0.7 = number to convert mass of outlet portions to metal free insolubles, g;

The total metal content of each metal in adsorbent B was determined from the equation, $$O = \sum_n M_i$$

where:
- $M_i$ = previously defined;
- n = number of adsorbent B beds in the column; and
- O = total mass of each element in adsorbent B, $\mu$g.

The concentration of each metal in the LPG was calculated from the equation, $$P = 1000(O+S)/G$$

where
- G = mass of the LPG passed through the adsorbent column, g
- O = previously defined
- P = concentration of each metal in the LPG, ppb
- S = previously defined
- 1000 = factor to convert to ppb

APPENDIX

This method is for determining 10 to 2000 mass parts per billion (1 g in $10^9$ g = 1 ppb) of mercury, antimony, arsenic, lead and copper by Graphite Furnace-Atomic Absorption Spectrometry (GF-AAS) in solutions that are obtained as described above. Equipment required for GF-AAS in addition includes an atomic absorption spectrophotometer, equipped with a recorder output proportional to absorbance units, a graphite furnace accessory, deuterium or Zeeman background correction accessory, and an automatic sampling system with 20-$\mu$L capacity, (e.g., Perkin Elmer, Model 5100 fitted with an auto-sampler and a graphite furnace attachment).

Ammonium dihydrogen phosphate was 99.999% minimum purity. Hydrogen peroxide was used as a 30% solution. Separate standard solutions of mercury, arsenic, lead, and copper in nitric acid and antimony in hydrochloric acid, each containing 1000-ppm separate solutions, were obtained from Inorganic Ventures.

Preparation of Standards

Three calibration standards are required to span the concentrations for each element in the adsorbent A and adsorbent B solutions. Therefore, if all 5 elements are to be determined, 30 standards are required. Standards were prepared at the concentrations shown in Table A-1. The antimony intermediate standards must be made fresh daily. The other intermediate standards are stable for approximately one week. The working standards must be made fresh daily.

Intermediate standards of antimony were prepared containing 25, 50, and 100 $\mu$g/ml. Intermediate standards of lead and copper contained 12.5, 25, and 50 $\mu$g/ml lead and copper. Intermediate standards of mercury contained 125, 250, and 500 $\mu$g/ml. Intermediate standards of Arsenic contained 12.5, 25, 50 and 100 $\mu$g/ml. Working standards of antimony contained 0.05, 0.1, and 0.2 $\mu$g/ml in adsorbent A, and in adsorbent B matrix in a 1:5 dilution. Working standards of copper and lead contained 0.025, 0.05, and 0.10 $\mu$g/ml in both adsorbent A and adsorbent B matrix. For arsenic it was 0.025, 0.05 and 0.1 $\mu$g/ml in adsorbent A and 0.05, 0.1, and 0.2 $\mu$g/ml in adsorbent B matrix in a 1:5 dilution.

Working standards of mercury contained 0.25, 0.5 and 1 µg/ml in both adsorbent A and B matrix.

PROCEDURE

GF-AAS Analysis

The instrument was set up according to the manufacturer's recommendations, using the graphite furnace settings in Table A-2. Portions of the sample solutions and working standards to be used for the determination of mercury were modified as follows. Separate 10-mL volumetric flasks were filled to the mark with adsorbent A and adsorbent B sample solution, 0.2 mL of peroxide was added to each with mixing. A 0.2 mL portion of peroxide was added to each of the 10-mL flasks containing the mercury working standards. 80-µL portions of the working standards and samples were pipetted into cups on the auto sampler using the volumes listed in Table A-2 and the modifiers were added as indicated in the table. The absorbance for each element in each sample solution was determined by running the calibration standards followed by the samples and the blanks for each element and for each adsorbent. Instrument stability was verified by repeating one standard.

CALCULATIONS

Standards

A least squares fit of the standard concentrations, µg/mL, and absorbances, or peak heights, were calculated for each element. The linearity of the standard absorbance plot was checked by determining the correlation coefficient, Q. If the value of Q is 0.999 or higher proceed with the calculations. If the value of Q is less than 0.999, one or more of the absorbances are outside the linear range and the calibration standards must be remade and analyzed again. In no case can one of the standards be dropped to perform the linear regression using only two standards.

Sample Solutions

The concentrations, $E_j$, of each element in each of the sample solutions were obtained from the jth portion of the packing by substitution of the sample absorbance or peak height into the equation for the best straight line. Alternatively, the concentration of each element in each solution can be calculated using the equation, $$E_j = A_j J + K$$

where:
- $A_j$ = the absorbance, or peak height, of the jth element in the sample solution, abs. units
- $E_j$ = the concentration of the jth element in the sample solution, µg/mL
- J = the slope of the best straight line for the jth element
- K = the intercept of the best straight line for the jth element The concentration of each metal in the LPG may be calculated using the equations previously given. Repeatability based on two tests performed by each of two analysts, on each of two days (8 tests) in one laboratory, the within-laboratory estimated standard deviation (esd) on a synthetic blend was calculated to be 0.6255 at a mercury concentration of 51 mass-ppb. Two tests performed in the one laboratory by different analysts on different days should not differ by more than 2.09 mass-ppb at the stated level (95% probability).

TABLE A-1

| | Composition of Working Standard Solutions | |
|---|---|---|
| Element | Final Concentrations, in Adsorbent A Blank-Solution | Final Concentrations, in Adsorbent B Blank-Solution |
| Copper | 0.025, 0.05 and 0.1 ppm | 0.025, 0.05 and 0.1 ppm |
| Mercury | 0.25, 0.5 and 1.0 ppm | 0.25, 0.5 and 1.0 ppm |
| Lead | 0.025, 0.05 and 0.10 ppm | 0.025, 0.050 and 0.10 µg/ml |
| Antimony | 0.05, 0.1 and 0.2 ppm | 0.05, 0.1 and 0.2 ppm in a 1:5 Dilution of Adsorbent B Blank-Solution |
| Arsenic | 0.025, 0.05 and 0.10 µg/ml | 0.05, 0.10 and 0.2 ppm in a 1:5 Dilution of Adsorbent B Blank-Solution |

TABLE A-2

| | Operating Conditions | | | | |
|---|---|---|---|---|---|
| | Arsenic | Antimony | Lead | Mercury | Copper |
| Wavelength, nm: | | | | | |
| Adsorbent A solutions | 193.7 | 217.6 | 283.3 | 253.6 | 324.8 |
| Adsorbent B solutions | 197.2 | 217.6 | 283.3 | 253.6 | 324.8 |
| Slit, nm | 0.7 | 0.2 | 0.7 | 0.7 | 0.7 |
| Modifier | none | none | ADP* | none | none |
| Modifier to Sample Ratio, Vol/Vol | none | none | 1 | none | none |
| Tube type | L'vov** | L'vov** | L'vov** | st'd*** | st'd*** |
| Max. power used | No | No | No | No | Yes |
| Dry temp., °C. | ← | — | 150 for all | — | → |
| Dry time, sec. | ← | — | 20 for all | — | → |
| Char Temp., °C. | 1000 | 1000 | 1000 | 150 | 1000 |
| Char time, sec. | ← | — | 20 for all | — | → |
| Atomization temp., °C. | 2400 | 2400 | 2400 | 1200 | 2400 |
| Atomization time, sec** | 7 | 7 | 8 | 7 | 7 |

Common Settings:
- Background correction: on.
- Furnace sample size: 20 µL
- Argon purge gas: on
- Argon flow rate: 30 mL/min
- Gas interrupt: on
- Recorder speed: 20 mm/min.
- Recorder chart expansion: X1.

*ammonium dihydrogen phosphate solution.
**L'vov platform
***Standard tube
****Between injections of the standard, sample or blank solutions, the graphite

TABLE A-2-continued furnace must be heated to 2500° C. for 5 sec to vaporize the matrix components that would otherwise accumulate and interfere with the determination.

What is claimed is:

1. A method of reducing the concentration of a metal, selected from the group consisting of mercury, antimony, lead, arsenic and copper, to no more than about 0.1 parts per billion in a first liquid hydrocarbon stream containing as high as about 5 parts per million of the metal, comprising contacting the first liquid hydrocarbon stream sequentially with a bed of a cation exchange resin which does not contain mercaptan or polysulfide moieties and a bed of a zeolitic molecular sieve surface-impregnated with ionic or elemental silver, and thereafter recovering a second liquid hydrocarbon stream having reduced metal concentration.

2. The method of claim 1 where the weight ratio of cation exchange resin to silver-impregnated zeolitic molecular sieve is from about 1:1 to about 4:1.

3. The method of claim 1 where the liquid hydrocarbon stream first contacts the cation exchange resin.

4. The method of claim 1 where the liquid hydrocarbon is selected from the group consisting of liquified petroleum gas, light and heavy naphthas, and liquified gas mixtures containing from about 0.1 to about 80% by volume of methane, ethane, propane, butane, pentane, or hexane.

5. The method of claim 2 where the liquid hydrocarbon is a liquified petroleum gas.

* * * * *